United States Patent
Hoffelder et al.

(10) Patent No.: US 9,689,413 B2
(45) Date of Patent: Jun. 27, 2017

(54) MAGNET RETENTION MEMBER AND LOCKING SLEEVE FOR A POSITION SENSOR ARRANGEMENT FOR A GEAR MECHANISM

(71) Applicant: Tyco Electronics AMP GmbH, Bensheim (DE)

(72) Inventors: Bernd Hoffelder, Roemerberg (DE); Gerhard Riedl, Friedrichstal (DE)

(73) Assignee: TE Connectivity Germany GMBH, Bensheim (DE)

( * ) Notice: Subject to any disclaimer, the term of this patent is extended or adjusted under 35 U.S.C. 154(b) by 231 days.

(21) Appl. No.: 14/388,802

(22) PCT Filed: Mar. 21, 2013

(86) PCT No.: PCT/EP2013/055915
§ 371 (c)(1),
(2) Date: Sep. 26, 2014

(87) PCT Pub. No.: WO2013/143963
PCT Pub. Date: Oct. 3, 2013

(65) Prior Publication Data
US 2015/0167716 A1    Jun. 18, 2015

(30) Foreign Application Priority Data
Mar. 30, 2012 (DE) .................. 10 2012 102 792

(51) Int. Cl.
*G01B 7/30* (2006.01)
*F16B 17/00* (2006.01)
(Continued)

(52) U.S. Cl.
CPC ............. *F16B 17/00* (2013.01); *F16H 59/70* (2013.01); *F16H 63/30* (2013.01); *G01D 5/12* (2013.01);
(Continued)

(58) Field of Classification Search
CPC .. F16H 63/30; F16H 2063/3076; F16H 59/70; F16H 63/38; F16B 17/00; G01D 5/12
(Continued)

(56) References Cited

U.S. PATENT DOCUMENTS

| | | | |
|---|---|---|---|
| 5,201,838 A * | 4/1993 | Roudaut | B25J 13/088 |
| | | | 294/206 |
| 2003/0112003 A1* | 6/2003 | Pfaffenberger | F02D 11/106 |
| | | | 324/207.2 |
| 2014/0035563 A1* | 2/2014 | Tan | B29C 45/281 |
| | | | 324/207.2 |

FOREIGN PATENT DOCUMENTS

| | | |
|---|---|---|
| DE | 202005020855 U1 | 9/2006 |
| DE | 102007010934 A1 | 9/2008 |
| EP | 1637779 A1 | 3/2006 |

OTHER PUBLICATIONS

International Preliminary Report on Patentability issued by The International Bureau of WIPO, Geneva, Switzerland, dated Oct. 1, 2014 for International Application No. PCT/EP/2013/055915; 4 pages.
(Continued)

*Primary Examiner* — Jay Patidar
(74) *Attorney, Agent, or Firm* — Faegre Baker Daniels LLP (57) ABSTRACT

The invention relates to a magnet retention member (1) which can be fitted to a wall (28) of a locking sleeve (27) for a gear mechanism, a locking sleeve (27) and a position sensor arrangement (37) for a gear mechanism. In order to be able to produce the position sensor arrangement (37) with the magnet retention member (1) and/or the locking sleeve (27) in the most cost-effective manner possible, there is provision according to the invention for the magnet retention member (1) to have a retention slot (4) for receiving a wall (28) of the locking sleeve (27), which is flanked by retention (Continued)

arms (2, 3) of the magnet retention member (1), the wall (28) having a securing portion (32) for the magnet retention member (1) and the position sensor (37) having a magnet retention member (1) according to the invention and/or a locking sleeve (27) according to the invention.

13 Claims, 3 Drawing Sheets (51) Int. Cl.
  *F16H 59/70* (2006.01)
  *F16H 63/30* (2006.01)
  *G01D 5/12* (2006.01)
  *F16H 63/38* (2006.01)

(52) U.S. Cl.
  CPC ...... *F16H 63/38* (2013.01); *F16H 2063/3076* (2013.01)

(58) Field of Classification Search
  USPC .......................................... 324/207.2–207.25
  See application file for complete search history.

(56) References Cited

OTHER PUBLICATIONS

International Search Report and Written Opinion issued by the European Patent Office dated Oct. 4, 2013, for related International Application No. PCT/EP2013/055915; 6 pages.

\* cited by examiner

MAGNET RETENTION MEMBER AND LOCKING SLEEVE FOR A POSITION SENSOR ARRANGEMENT FOR A GEAR MECHANISM

BACKGROUND

The invention relates to a magnet retention member which is constructed so as to be able to be fitted to a wall of a locking sleeve for a gear mechanism. Furthermore, the invention relates to a locking sleeve for a gear mechanism having a wall, a slotted switching member being provided in the wall. Furthermore, the invention relates to a position sensor arrangement for a gear mechanism, having a magnetic position sensor which is constructed as a magnet retention member and a guide for switching movements having a locking sleeve.

Magnet retention members, locking sleeves and position sensor arrangements for gear mechanisms which are constructed so as to be able to be fitted to a wall of a locking sleeve are known and are used, for example, in the automotive field for gear mechanisms. For example, the magnet retention member is secured to the locking sleeve in a predetermined position so that, using the position sensor arrangement which comprises the magnet retention member and the locking sleeve, it can be determined whether a gear has been engaged or whether the gear mechanism is in idle mode. The information relating to the state of the gear mechanism is used in modern motor vehicles, for example, for controlling an automatic start/stop system.

In order to fix the magnet retention member to the locking sleeve, they are, for example, screwed together. To this end, there is intended to be provided, either in the locking sleeve or in the magnet retention member, a threaded opening which increases the production complexity. Furthermore, the screw connection cannot readily be produced in an automatic manner. The production complexity and the costs brought about thereby during the production of the position sensor arrangement are consequently high.

SUMMARY

An object of the invention is therefore to provide a magnet retention member, a locking sleeve and a position sensor arrangement which can be produced in a cost-effective manner.

This object is achieved for the magnet retention member mentioned in the introduction in that the magnet retention member has a first and a second retention arm, the retention arms delimiting a retention slot for receiving a securing portion of the wall in a mutually opposing manner. For the locking sleeve mentioned in the introduction, this object is achieved in that the wall of the locking sleeve is provided with a securing portion for fitting a magnet retention member according to the invention. Furthermore, this object is achieved for the position sensor arrangement mentioned in the introduction in that the magnet retention member and/or the locking sleeve are constructed in accordance with the invention.

The magnet retention member according to the invention can be readily fitted to the wall of the locking sleeve by means of mounting on the wall so that it is neither necessary to provide screw openings, nor does the magnet retention member have to be screwed to the locking sleeve in a complex and possibly manual manner.

The solution according to the invention can be further improved by means of various embodiments which are advantageous per se and which can be freely combined with each other. These embodiments and the advantages connected therewith are discussed below, the structural measures and the effects thereof being described merely by way of example.

In order to be able to position a magnet on the locking sleeve using the magnet retention member, one of the retention arms may be constructed with a magnet housing which has a magnet receiving member. The magnet housing may be produced using injection-moulding technology and the magnet receiving member may be sized in such a manner that the magnet can be inserted in the magnet receiving member. After the magnet has been inserted, this would still have to be secured in another production step. In order to save this production step, the magnet housing may also be injection-moulded around the magnet. Alternatively, the magnet may be produced from a material which can also be formed by means of an injection-moulding method. The magnet housing can then be injection-moulded together with the magnet, for example, using a so-called multi-component injection-moulding method.

In order to reinforce the connection between the magnet retention member and the locking sleeve, the magnet receiving member may be constructed so as to be open with respect to the retention slot. The magnetic field which is brought about by the magnet arranged in the magnet receiving member can then reach the retention slot without being weakened by the magnet housing. If the securing portion of the wall is now arranged for fitting the magnet retention member in the retention slot and can be magnetised, for example, is ferromagnetic, the magnetic field may act in an unimpeded manner on the wall and bring about retention forces. Furthermore, the sleeve may be magnetisable per se or may be produced from a magnetisable material.

The closer the magnet extends towards the retention slot, the higher the retention forces brought about between the magnet and the locking sleeve may be. In order to be able to bring the magnet as close as possible to the retention slot and consequently, in the assembled state of the magnet retention member, up to the locking sleeve, the magnet may be provided in the magnet retention member so as to be contactable from the retention slot.

The retention force brought about reaches a maximum when the magnet is in abutment with the locking sleeve. To this end, the magnet preferably has an abutment face which is directed towards the retention slot and which is constructed so as to substantially complement the wall of the locking sleeve.

In order to prevent the magnet from being retained with spacing from the wall by the magnet housing, the magnet housing may adjoin the retention slot in a flush manner with the magnet thereof or the abutment face thereof. Alternatively, the magnet may protrude or project from the housing into the retention slot.

If the locking sleeve or the position sensor arrangement is used in a fixed manner, for example, with respect to the bodywork of the vehicle, it may be sufficient, in order to secure the magnet retention member to the locking sleeve, for the two retention arms to hold the wall in the retention slot by means of clamping forces. The magnet retention member may thus be placed in a simple manner in a mounting direction on the securing portion. The retention forces brought about by the magnet may ensure additional securing of the position of the magnet retention member.

However, since in particular a vehicle constitutes a highly dynamic environment for use of the magnet retention member, the locking sleeve and the position sensor arrangement, the clamping forces of the retention arms or magnetic retention forces of the magnet may potentially be insufficient for secure fitting of the magnet retention member to the locking sleeve. In order to further stabilise the position of the magnet retention member with respect to the locking sleeve, one of the retention arms may be constructed as a catch arm having a catch element for engagement with the locking sleeve. The locking sleeve may have a counter-catch element. Owing to the mechanical catch connection, the magnet retention member is fitted securely to the locking sleeve, even in the event of acceleration forces, for example, acceleration forces acting in a longitudinal or transverse direction, or in the event of vibration and cannot readily be released from the locking sleeve. The catch element of the magnet retention member is constructed, for example, as a catch projection and the counter-catch element of the locking sleeve as a catch receiving member. Although the catch element of the locking sleeve could also be constructed as a catch projection, since locking sleeves are generally produced from a metal sheet, it is more simple to punch a catch receiving member in the metal sheet.

Owing to the catch connection, the magnet retention member is secured against sliding from the locking sleeve counter to the mounting direction. A precise determination of the switching state of the gear mechanism may, however, also be made more difficult by imprecise positioning of the magnet retention member on the locking sleeve transversely relative to the mounting direction. Consequently, it is advantageous for the magnet retention member and/or the locking sleeve to be provided with at least one auxiliary positioning member. The at least one auxiliary positioning member may be constructed as a positive-locking element, for example, as a positioning tongue or a positioning protrusion, which interacts with a complementary positive-locking element of the locking sleeve, for example, a positioning receiving member, as soon as the magnet retention member is assembled. One of the positive-locking elements of the magnet retention member may be arranged on the catch arm, and, for example, adjoin a securing face of the catch element, whereby an additional structural space for that positive-locking element is superfluous. It may also be more simple in this instance to punch a positioning receiving member in the wall of the locking sleeve, and to form the positioning tongue on the magnet retention member.

The auxiliary positioning member described previously uses a single position securing location which is determined by the two mutually co-operating positive-locking elements. However, in order to prevent an undesirable incorrect position of the magnet retention member with respect to a longitudinal direction of the locking sleeve, a second position securing location would be advantageous. Consequently, the magnet retention member may have another positive-locking element, which is arranged with the largest possible spacing with respect to the other positive-locking element of the magnet retention member. For example, one positive-locking element may be arranged at one end of the magnet retention member and the other positive-locking element at another end of the magnet retention member. If one positive-locking element is arranged in the region of a free end of one of the retention arms, it is advantageous for the other positive-locking element of the magnet retention member to be provided on a base of the magnet retention member which is arranged opposite that free end. The retention arms may be secured to the base.

The positive-locking element provided in the base, acting as a positioning receiving member which opens in the mounting direction or longitudinal direction, may receive a positioning pin of the locking sleeve which extends counter to the mounting direction, preferably in a play-free manner.

The auxiliary positioning member described having at least one or even a plurality of position securing locations may further form a tilting prevention system, which at least limits a tilting of the magnet retention member which is fitted to the locking sleeve relative to the locking sleeve. The auxiliary positioning member acts in this instance as a torque compensator which directs forces which are acting on the assembled magnet retention member and which extend around the vertical direction of the magnet retention member into the wall of the locking sleeve.

In order also to be able to direct forces which are acting in the longitudinal or mounting direction into the locking sleeve, the tilting prevention system may have at least one support element. The support element may be constructed so as to extend away from the retention slot and be supported in the assembled state of the magnet retention member on an outer or inner side of the wall. In order to prevent a localised loading of the support element and the locking sleeve, the support element may be constructed for planar abutment against the wall in the region of the securing portion. If the locking sleeve is cylindrical and constructed with an annular cross-section, the support element is preferably curved or wing-like or arc-like so that it can abut the wall in a planar manner.

In order to be able to fit the magnet retention member on the wall in a simple manner, the retention slot may at least partially expand in the direction towards the open end thereof. To this end, there may be arranged on one of the retention arms an inclined introduction member which is orientated in the direction towards a free end of the other retention arm.

In a preferred embodiment, the first retention arm is provided with the magnet housing and the second retention arm is constructed as the catch arm. Furthermore, the inclined introduction member is preferably arranged at the free end of the first retention arm or the magnet housing.

In particular, in order to control the automatic start/stop system, it may be desirable to determine the state of the gear mechanism in which no gear is engaged. However, the gear mechanism may assume a plurality of idle positions along the selection channel, without a gear having been engaged. In order to be able to establish all the idle positions, the magnet retention member may have a larger dimension parallel with the selection channel than transversely relative thereto. For example, the length of the magnet retention member or the magnet receiving member parallel with the longitudinal direction of the retention slot is larger than the width of the magnet retention member or the magnet receiving member. If the length of the magnet receiving member corresponds to at least the length of the selection channel, all the idle positions may be recorded by a magnet sensor whose length is smaller than the length of the selection channel.

Another cost driver is the magnet since only magnets with a specific orientation of the magnetic field ensure a precise determination of the state of the gear mechanism. If the orientation of the magnetic field brought about by the magnet deviates excessively from a desired value, the state of the gear mechanism can no longer be determined in a reliable manner. Consequently, magnets must be selected with reference to the orientation of their magnetic field, which further increases the total costs of the position sensor arrangement.

In order now to achieve a sufficiently precise orientation of the magnetic field and consequently to be able to determine the switching state of the gear mechanism, the abovedescribed mechanical or magneto-mechanical provisions for securing and positioning the magnet retention member may not be sufficient. However, if the locking sleeve is magnetisable preferably in a manner extending at least in the region of its securing portion, and perhaps even completely, for example, is ferromagnetic, the locking sleeve amplifies the magnetic field of the magnet. If the orientation of the magnetic field of the magnet alone deviates from previously valid limit values, the switching state cannot be determined in a reliable manner. However, since the locking sleeve is generally better orientated than the magnetic field of the magnet, the magnetic amplification by the better orientated locking sleeve results in the magnetic field which is emitted on the whole by the position sensor arrangement being better orientated than the magnetic field of the magnet alone.

Consequently, magnets with a previously inadequately orientated magnetic field may also be used. Owing to the amplification, magnets can also be used which were previously too weak. The costs for the magnet are thereby reduced. The amplification is particularly advantageous when the magnetic field of the magnet, aside from the directional deviations described, extends substantially parallel with the radial direction of the locking sleeve when leaving the magnet, that is, perpendicularly relative to the wall, and the magnet is in direct mechanical contact with the locking sleeve.

The invention is explained below by way of example with reference to embodiments and the drawings. The various features of the embodiments may be combined independently of each other, as already set out in the individual advantageous embodiments.

DETAILED DESCRIPTION

The structure and function of a magnet retention member according to the invention will first be described with reference to the embodiment of FIG. 1.

Figure 1:
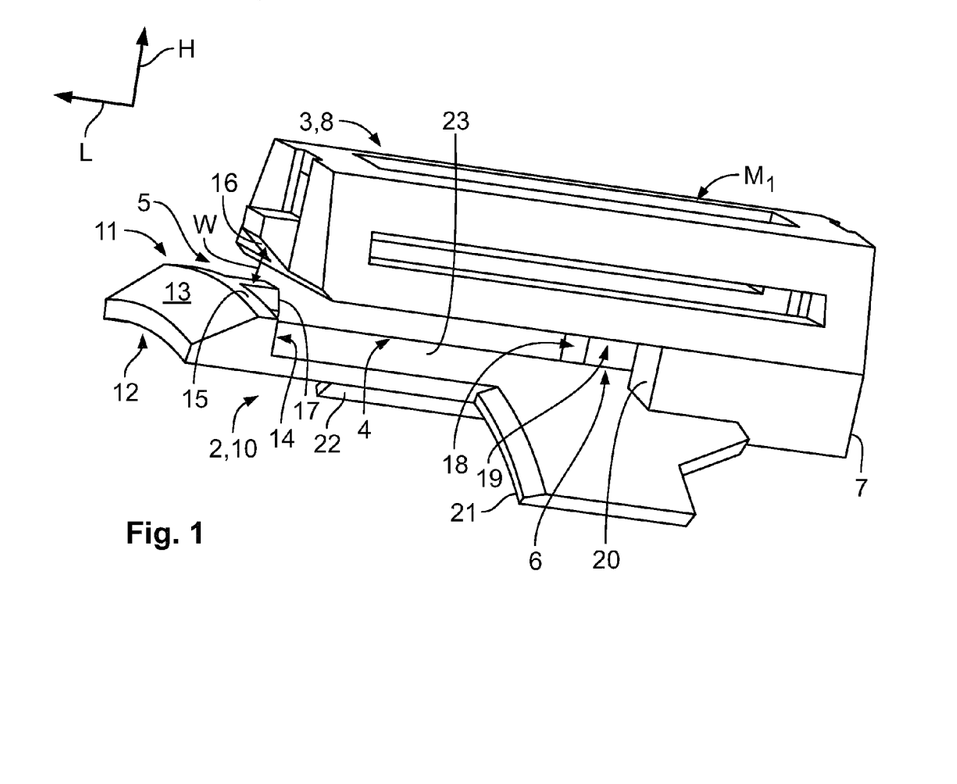
FIG. 1 is a schematic, perspective illustration of an embodiment of a magnet retention member according to the invention.

FIG. 1 is a schematic perspective side view of the magnet retention member 1. The magnet retention member 1 may be configured to be able to be fitted to a wall of a locking sleeve (not illustrated here) for a gear mechanism. In order to be able to fit the magnet retention member 1 to the wall of the locking sleeve, the magnet retention member 1 may have two retention arms 2, 3. The retention arms 2, 3 may be arranged opposite each other in a vertical direction H of the magnet retention member 1 and flank a retention slot 4 of the magnet retention member 1. A longitudinal direction L of the retention slot 4 may extend transversely relative to the vertical direction H. An end of the retention slot 4 directed in the longitudinal direction L may be constructed as an open end 5 through which a securing portion of the wall can be inserted into the retention slot 4. At its end 6 of the retention slot 4 opposite the open end 5 parallel with the longitudinal direction L, the retention slot 4 may adjoin a base 7 of the magnet retention member 1. The retention arms 2, 3 may be secured to the base 7 and extend from the base 7 substantially parallel with each other in the longitudinal direction L.

One of the retention arms 2, 3 and in particular the retention arm 3 may be constructed with a magnet housing 8 for a magnet. The magnet housing 8 may have a magnet receiving member 9 in which the magnet can be retained in the magnet housing 8. In the embodiment of FIG. 1, however, the magnet is not shown. The magnet housing 8 which comprises the magnet receiving member 9 may be constructed as an injection-moulded component in which the magnet is inserted. Alternatively, the magnet may be connected to the magnet housing 8 using injection-moulding technology. For example, the magnet can be injection-moulded with the magnet housing 8. It is also possible to produce the magnet using injection-moulding technology and to produce the magnet housing 8 together with the magnet in a so-called multi-component injection-moulding method.

A side of the magnet housing 8 directed in a vertical direction H and away from the retention slot 4 may be constructed with a magnet opening $M_1$, through which a magnetic field of the magnet arranged in the magnet receiving member 9 can freely extend from the magnet housing 8.

The magnet retention member 1 may further have a catch arm 10 for connection to the wall of the locking sleeve. In order to fit the magnet retention member 1 to the wall and engage it, the catch arm 10 is preferably connected to the base 7 so as to be able to be resiliently deflected parallel with the vertical direction H. In many fields of use, for example, when no or only small mechanical forces are acting on the magnet retention member 1 which is fitted to the locking sleeve, the resilient forces of the catch arm 10 may be sufficient for a mechanically stable connection to the wall 10. In such a case, the catch arm 10 may also be described as a clamping arm.

Using the catch arm 10, the magnet retention member 1 may, however, also engage with the wall of the locking sleeve and consequently couple together the magnet retention member 1 and the locking sleeve in a more mechanically secure manner than by clamping alone. So that the magnet retention member 1 can be fitted more securely to the wall, it is advantageous for the catch arm 10 to have at least one catch element 11 for engagement with the locking sleeve.

The catch element 11 may, for example, be provided as an undercut portion, optionally in the form of a recess in the catch arm 10. A counter-catch element of the locking sleeve would in this instance preferably be intended to be constructed as a catch projection. However, since the locking sleeve is often produced from a metal sheet, it is more simple in technical production terms for the locking sleeve not to be constructed with a catch projection, but instead with an undercut portion which is punched in the metal sheet or a catch receiving member as a counter-catch element. The catch element 11 of the catch arm 10 may be inserted in the locked state at least partially or completely into the catch receiving member of the locking sleeve and consequently save the structural space required for the fitted magnet retention member 1. The catch arm 10 can be produced in the same manner as the magnet housing 8 using injection-moulding technology and consequently be constructed in a simple manner with a catch element 11, for example, in the form of a catch projection. The catch projection may extend parallel with the vertical direction H from the catch arm 10 into the retention slot 4 and in a state in which the magnet retention member 1 is mounted on the locking sleeve, engage behind the counter-catch element in the form of the catch undercut portion in the wall and consequently produce the catch connection between the magnet retention member 1 and locking sleeve.

The catch element 11 is preferably arranged at a free end 12 of the catch arm 10 facing away from the base 7. The free end 12 of the catch arm 10 may be orientated in the longitudinal direction L of the retention slot 4 and the catch element 11 may protrude parallel with the vertical direction H into the retention slot 4 or at least partially delimit it in the longitudinal direction L. The catch element 11 which is constructed in FIG. 1 as a catch projection preferably has an inclined introduction member 13 for the locking sleeve which is directed at least partially in the vertical direction H and the longitudinal direction L, that is to say, transversely away from the base 7. At least in the region of the inclined insertion member 13, the catch element 11 may be constructed in a wedge-like manner and taper in the longitudinal direction L as far as the end thereof.

A portion of the catch element 11 directed towards the base 7 may have a securing face 14 which is orientated substantially perpendicularly relative to the longitudinal direction L or parallel with the vertical direction H and which adjoins the retention slot 4 or at least partially delimits it in the longitudinal direction L.

Between the inclined introduction member 13 and the securing face 14, the catch element 11 may have a sliding face 15 which extends substantially parallel with the longitudinal direction L. When the magnet retention member 1 is fitted to the locking sleeve, the wall which is intended to be introduced into the retention slot 4 may slide on the sliding face 15. The catch element 11 which is described here and which is shown in the embodiment of FIG. 1 is therefore in the form of a catch hook.

In order to be able to mount the magnet retention member 1 on the wall in a simple manner, the open end 5 of the retention slot 4 directed in the longitudinal direction L is preferably funnel-shaped and thus expands substantially in the longitudinal direction L. A clearance W of the open end 5 which increases substantially in the longitudinal direction L between the catch arm 10 and the opposing retention arm 2, 3 may extend between the sliding face 15 and an inclined insertion member 16. The inclined insertion member 16 is advantageously arranged at the free end of the retention arm 2, 3 opposite the catch arm 10 and may move away from the retention arm 2, 3 opposite the catch arm 10 in its path in the longitudinal direction L. The clearance W is preferably intended to be sized in such a manner that the wall of the locking sleeve can be inserted into the retention slot 4 in a simple manner and without great application of force. The catch arm 10 may project beyond the opposing retention arm 2, 3 in the longitudinal direction L.

According to a preferred embodiment, the retention arm 2 which is opposite the retention arm 3 having the magnet housing 8 is constructed as a catch arm 10.

Owing to the catch element 11, the magnet retention member 1 can be secured against undesirable displacement counter to the longitudinal direction L on the wall of the locking sleeve. The end 6 of the retention slot 4 closed by the base 7 prevents the magnet retention member 1 from being pushed onto the wall too far in the longitudinal direction L. In order to be able to prevent the magnet retention member 1 which is fitted to the wall from carrying out undesirable tilting or rotation movements relative to the locking sleeve, the magnet retention member 1 may be provided with a tilting prevention system. The tilting prevention system is constructed, for example, as a torque compensator which directs forces which, without a tilting prevention system, bring about a tilting or rotation of the magnet retention member 1, into the locking sleeve. In order to absorb these forces, the locking sleeve may have at least one torque receiving member which co-operates with the torque compensator. The torque compensator and the torque receiving member may each have at least one positive-locking element which preferably adjoins the retention slot and/or the catch element. The tilting prevention system is arranged on one of the retention arms 2, 3 in a preferred embodiment. Owing to such a configuration, the dimension of the magnet retention member 1 can be kept small.

For example, the positive-locking element is constructed as a positioning protrusion 17 which extends parallel with the vertical direction H in the retention slot 4. In the embodiment illustrated in FIG. 1, the positive-locking element which is constructed as a positioning protrusion 17 adjoins the catch element 11 and extends from the securing face 14 counter to the longitudinal direction L. In order to prevent hooking with respect to the locking sleeve, at least selected edges of the positioning protrusion 17 may be deburred or constructed with a chamfer. If the positioning protrusion 17 has an elongate form, the positioning protrusion 17 may also be referred to as a positioning tongue 17.

Using the positioning protrusion 17, at least the free end 12 of the catch arm 10 may be protected against movements transversely relative to the vertical direction H and the longitudinal direction L. In order also to be able to prevent corresponding pivot movements of the base 7, the base 7 may also be provided with a positive-locking element. The base 7 may also be constructed with a positioning tongue or a positioning protrusion which preferably extends in the longitudinal direction L and vertical direction H into the retention slot 4. In the embodiment of FIG. 1, however, the base 7 is constructed with a positioning receiving member 18. The positioning receiving member 18 preferably opens in the longitudinal direction L with respect to the retention slot 4 so that a portion of the torque compensator of the locking sleeve that is constructed in a substantially complementary manner with respect to the positioning receiving member 18 protrudes into the positioning receiving member 18 when the magnet retention member 1 is in the assembled state.

In order to be able to form the positioning receiving member 18 in the base 7 in a simple manner, the positioning receiving member 18 may extend completely through the base 7 parallel with the longitudinal direction L. For example, the positioning receiving member 18 may be constructed as a hole which extends through the base 7. If not only the retention arms 2, 3, but also the base 7 are intended to be produced using injection-moulding technology, the positioning receiving member 18 may be formed in a simple manner, for example, using a sliding member of an injection-moulding tool. Transversely relative to the longitudinal direction L and the vertical direction H there remain lateral walls 19, 20 which connect the retention arms 2, 3 to each other so as to form the base 7 and delimit the positioning receiving member 18 transversely relative to the vertical direction H and the longitudinal direction L. The lateral walls 19, 20 interact with the substantially complementary portion of the torque receiving member of the locking sleeve and direct forces acting on the base 7 of the magnet retention member 1 into the locking sleeve.

The previously described tilting prevention system may further improve the positioning of the magnet retention member 1 on the locking sleeve if the positive-locking elements predetermine the relative position of the magnet retention member 1 with respect to the locking sleeve transversely relative to the longitudinal direction L. Such a tilting prevention system which can also be referred to as an auxiliary positioning member positions in a particularly precise manner if the positive-locking elements of the magnet retention member 1 and the locking sleeve which interact with each other can be connected with the least possible play or in a play-free manner.

Owing to the previously described tilting protection system, the magnet retention member 1 may be secured against movements about the vertical direction H on the locking sleeve. Alternatively or additionally, however, the magnet retention member 1 may also be provided with a tilting prevention system which at least limits relative movements between the magnet retention member 1 and locking sleeve about the longitudinal direction L. To this end, the magnet retention member 1 may be constructed with at least one torque compensator which abuts the wall transversely relative to the vertical direction H and the longitudinal direction L with spacing from the retention slot 4 when the magnet retention member 1 is fitted to the locking sleeve.

Such a tilting prevention system may, for example, be formed by a support element in the form of a support arm 21. In order to be able to protect the magnet retention member 1 against undesirable movements in two directions about the longitudinal axis, the tilting prevention system may have not only a support arm 21, but also an additional support element in the form of a second support arm 22. The support arms 21, 22 may extend transversely relative to the vertical direction H and the longitudinal direction L away from the retention slot 4 and be formed to be in abutment with an outer face or an inner face of the locking sleeve in the assembled state of the magnet retention member 1. In order to be able to effectively direct forces acting on the magnet retention member 1 into the wall, the support arms 21, 22 may be in planar abutment with the wall of the locking sleeve when the magnet retention member 1 is mounted. Often the locking sleeve has an annular cross-section so that the support arms 21, 22 are preferably constructed in a curved manner, or in a wing-like or arcuate manner and can fit closely against the wall.

For example, the support arms 21, 22 are arranged on one of the retention arms 2, 3 and in particular in each case at a longitudinal side of the retention arm 2, 3 which extends parallel with the longitudinal direction L. A side 23 of the retention arm 2, 3 provided with the support arms 21, 22 facing the retention slot 4 may continue the shape of the support arms 21, 22 and, together with these, abut the sleeve in a planar manner in the assembled state of the magnet retention member 1. In the embodiment of FIG. 1, the support arms 21, 22 are arranged on the catch arm 10.

Figure 2:
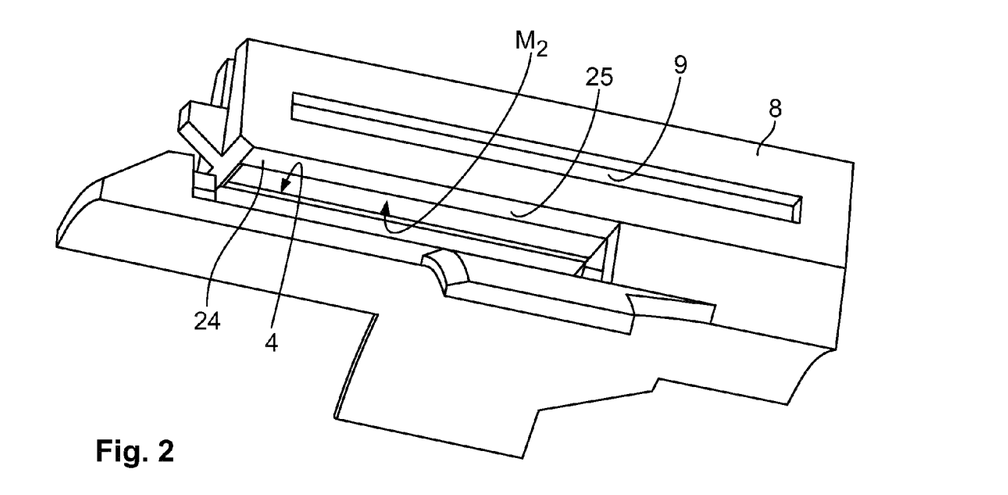
FIG. 2 is a schematic, perspective illustration of the magnet retention member of the embodiment of FIG. 1.

FIG. 2 is a perspective side view of the embodiment of the magnet retention member 1 illustrated in FIG. 1, which enables a view of the side 24 of the magnet housing 8 facing the retention slot 4.

The side 24 of the magnet housing 8 facing the retention slot 4 may be formed with a magnet opening $M_2$, through which the magnet receiving member 9 or a magnet which is arranged in the magnet housing 8 can be contacted from the retention slot 4. The magnet may be constructed with an abutment face which is directed towards the retention slot 4 and by means of which the magnet can abut the locking sleeve. For example, the magnet housing 8 can be constructed in such a manner that the magnet arranged in the magnet receiving member 9 adjoins the retention slot 4 in an aligned manner with an edge 25 of the magnet housing 8 that surrounds the magnet opening $M_2$. Alternatively, the magnet may also protrude through the magnet opening $M_2$ into the retention slot 4, that is to say, protrude counter to the vertical direction H with respect to the magnet housing 8 or the edge 25 thereof.

Figure 3:
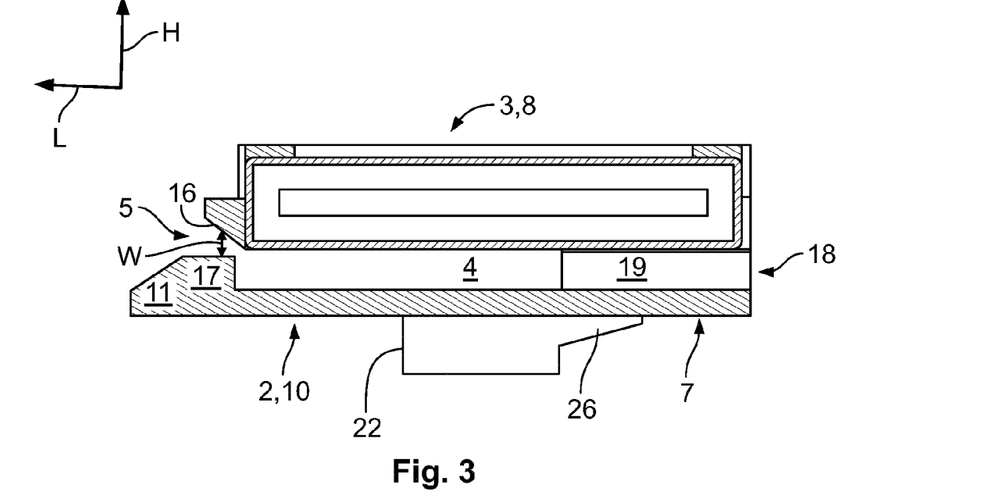
FIG. 3 is a schematic sectioned illustration of the magnet retention member of the embodiment of FIGS. 1 and 2.

FIG. 3 is a sectioned illustration of the embodiment of the magnet retention member 1 illustrated in FIGS. 1 and 2, the plane of section extending parallel with the vertical direction H and the longitudinal direction L. In the sectioned illustration of FIG. 3, it can clearly be seen that the retention slot 4 can extend into the positioning receiving member 18 which extends through the base 7. In contrast to the positioning receiving member 18, however, the retention slot 4 may be constructed so as to be open transversely relative to the vertical direction H and the longitudinal direction L so that the magnet retention member 1 can be placed in a simple manner on the walls of the locking sleeve. As can clearly be seen, the clearance W between the inclined introduction member 16 and the catch element 11 or the positioning protrusion 17 increases in the embodiment of FIG. 3 in the longitudinal direction L. The funnel-like open end 5 of the retention slot 4 therefore expands in the longitudinal direction L.

In order to stabilise the support arms 21, 22, they can each be connected to the base 7 by means of a stabilisation angle 26. In the sectioned illustration of FIG. 3, only the stabilisation angle 26 of the support arm 22 can be seen.

The magnet retention member 1 of the embodiment of FIGS. 1 to 3, may be generally produced as a single injection-moulded component, which is provided together with the magnet.

Figure 4:
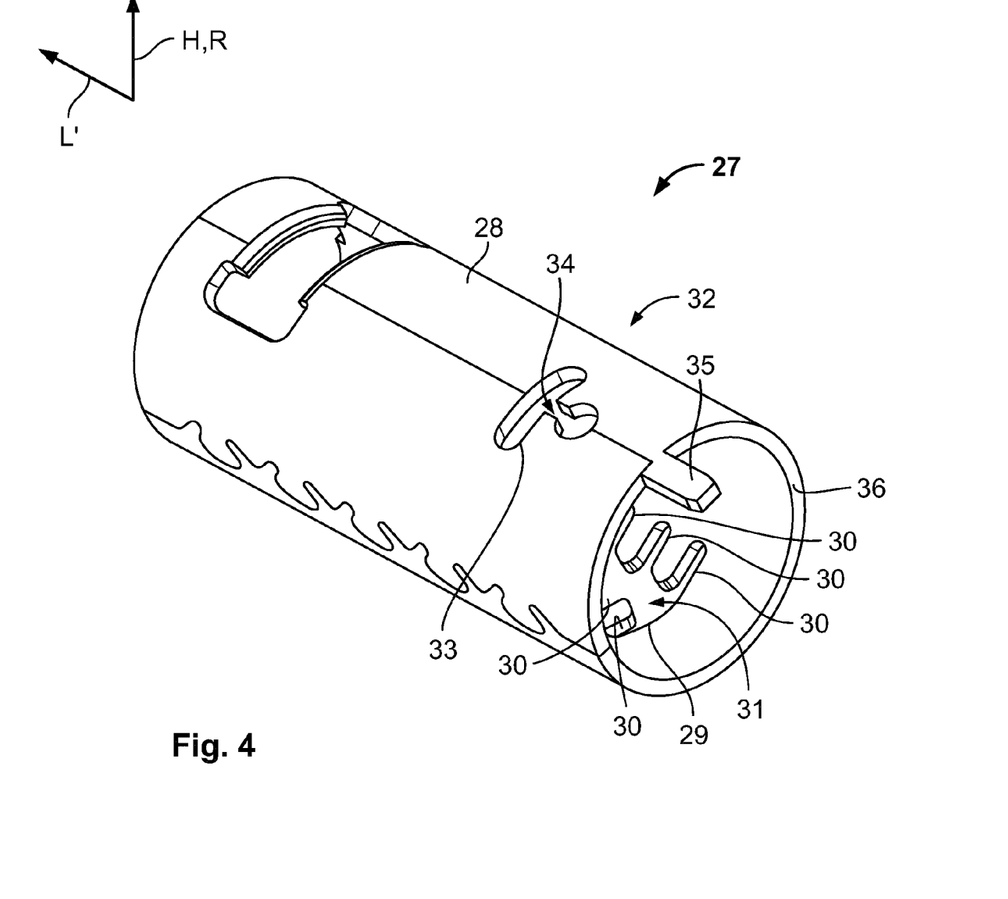
FIG. 4 is a schematic, perspective illustration of an embodiment of a locking sleeve according to the invention.

FIG. 4 is a schematic, perspective view of an embodiment of the locking sleeve according to the invention for a gear mechanism.

The locking sleeve 27 often has an annular cross-section and is constructed in a substantially cylindrical manner, the locking sleeve 27 extending in a longitudinal direction L'. In a wall 28 of the locking sleeve 27, a slotted switching member 29 is formed for guiding switching movements of the gear mechanism. A plurality of switching channels 30 of the slotted switching member 29 each open in a selection channel 31. Via the slotted switching member 29, it is possible to guide, for example, a guiding pin of a gear mechanism or a gear shift linkage and consequently switching movements of the gear. If the guiding pin is arranged in the selection channel 31, the gear mechanism is not in one of the gears, but instead in idle mode.

The locking sleeve 27 may further be constructed with a securing portion 32, the securing portion 32 being constructed to fit the magnet retention member 1 to the locking sleeve 27.

In order to be able to engage the magnet retention member 1 with the locking sleeve 27, the securing portion 32 may have at least one counter-catch element 33. The counter-catch element 33 may be constructed as a catch projection. According to the embodiment of FIG. 4, the counter-catch element 33 is preferably a catch opening which is formed in the wall 28 and which preferably extends counter to a radial direction R of the locking sleeve 27 into the wall 28 and, for example, even through the wall 28.

In order to prevent a tilting or rotation of the fitted magnet retention member 1 relative to the locking sleeve 27 and about the radial direction R, the locking sleeve 27 may be provided with at least one torque receiving member. The torque receiving member may be constructed at least partially so as to complement the at least one positive-locking element and, for example, the positioning protrusion 17 of the magnet retention member 1. The torque receiving member may thus be provided as a recess 34 which is formed in the wall 28 and which extends in or counter to the radial direction R. As illustrated in the embodiment of FIG. 4, the recess 34 may extend in the radial direction R as an opening completely through the wall 28.

In order to prevent torsion or tilting of the assembled magnet retention member 1, securing only by the recess 34 together with the positioning protrusion 17 may potentially not be sufficient. Consequently, the locking sleeve 27 may be constructed either with another or with an additional positive-locking element. This positive-locking element may also be constructed so as to complement the corresponding positive-locking element of the magnet retention member 1. If the base 7 is provided with the positioning receiving member 18, the positive-locking element of the locking sleeve 27 may be constructed as a positioning protrusion or pin 35 which extends counter to the longitudinal direction L. The positioning pin 35 may, for example, be arranged on an end face 36 of the locking sleeve 27 directed counter to the longitudinal direction L. In the longitudinal direction L, the positioning pin 35 may be spaced apart from the recess 34 and in particular arranged in front of it.

Figure 5:
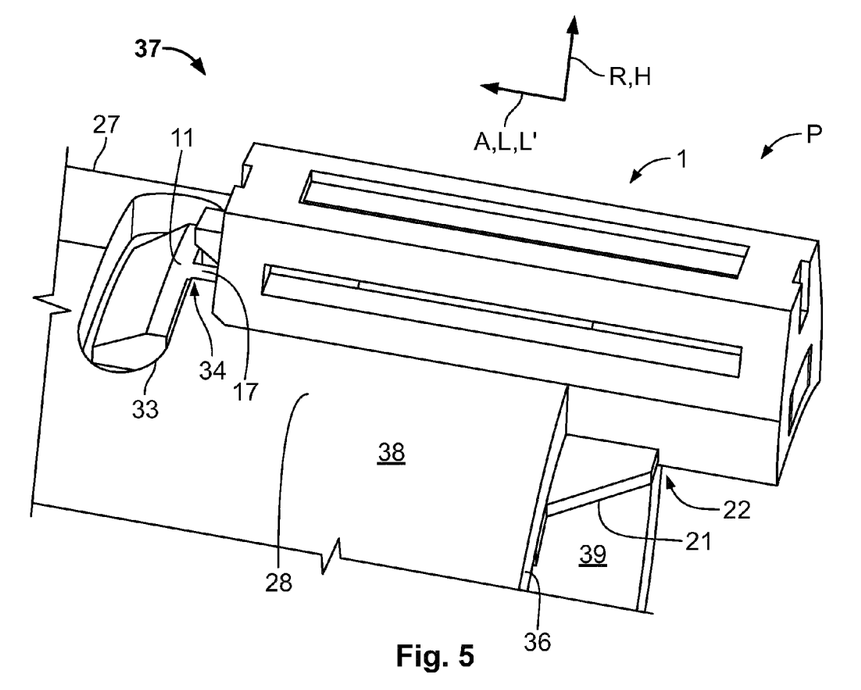
FIG. 5 is a schematic, perspective illustration of an embodiment of a position sensor arrangement according to the invention.

FIG. 5 is a schematic, perspective view of a portion of a position sensor device 37 according to the invention as a magnetic position sensor. The position sensor arrangement preferably has as a magnetic position sensor the magnet retention member 1 and/or, as a guide of switching movements, the locking sleeve 27. The magnet retention member 1 is fitted to the locking sleeve 27, that is to say, illustrated in the assembled state thereof. For example, the magnet retention member 1 is mounted in a mounting direction A facing in the longitudinal direction L of the retention slot 4 onto the wall 28 of the locking sleeve 27, the end face 36 of the locking sleeve 27 being arranged so as to face counter to the longitudinal direction L. The longitudinal directions L and L' are in alignment with each other in the illustrated embodiment. Owing to the funnel-like configuration of the open end 5 of the retention slot 4, the wall 28 may be introduced into the retention slot 4 when the magnet retention member 1 is positioned, the catch arm 10 being resiliently deflected counter to the vertical direction H. In the illustrated assembly position P of the magnet retention member 1, the catch arm 10 has at least partially returned in the vertical direction H into the initial position thereof again, the catch element 11 engaging with the counter-catch element 33 and now overlapping it in the longitudinal direction L. The positioning protrusion 17 is preferably inserted into the recess 34 by means of the same movement of the catch arm 10. The positioning pin 35 is preferably arranged in the positioning receiving member 18. All the positive-locking elements mentioned, the positioning protrusion 17, positioning receiving member 18, recess 34 and positioning pin 35, are preferably intended to be sized in such a manner that they ensure a low-play or play-free arrangement of the magnet retention member 1 on the locking sleeve 27.

The support arms 21, 22 which are illustrated in a curved manner, for additional stabilisation of the position of the magnet retention member 1 relative to the locking sleeve 27, may abut an outer face 38 of the wall 28, the outer face being directed in the radial direction R away from the locking sleeve 27. Alternatively, at least one and optionally both of the support arms 21, 22 may abut an inner face 39 of the wall 28, the inner face being directed counter to the radial direction R into the inner side of the locking sleeve 27. The support arms 21, 22 may abut the wall 28 loosely or in a pretensioned manner.

Figure 6:
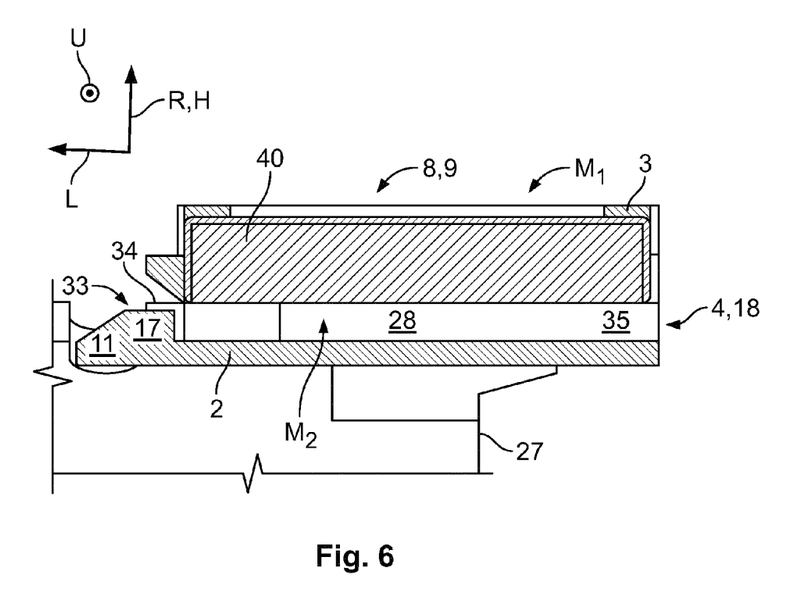
FIG. 6 is a schematic sectioned illustration of the position sensor arrangement of the embodiment of FIG. 5.

FIG. 6 is a schematic sectioned view of the embodiment of the position sensor arrangement 37, the plane of section extending parallel with the longitudinal directions L, L' and the vertical direction H or the radial direction R. FIG. 6 clearly shows that the wall 28 can be received in a substantially play-free manner by the retention slot 4 and the positioning pin 35 can also be received in a play-free manner by the positioning receiving member 18. Both the retention arm 2 and the retention arm 3 may abut the wall 28 in a tight manner. As shown in FIG. 6, a magnet 40 may be arranged in the magnet receiving member 9 of the magnet housing 8, the magnet 40 being non-movable relative to the magnet housing 8. The magnet 40 may abut the wall 28 with the abutment face 41 thereof through the magnet opening 2. In order to be able to produce the most extensive contact possible between the magnet 40 and the locking sleeve 27, the abutment face 41 may be constructed in accordance with the shape of the securing portion 32. If the side of the wall 28 facing the abutment face 41 is curved, for example, in a concave manner in the region of the securing portion 32, the abutment face 41 may be constructed in a convex-curved manner with a comparable radius. In the case of a wall 28 which is curved in a convex manner, the abutment face 41 may be curved in a correspondingly concave manner.

If the locking sleeve 27 can be magnetised, at least in the region of the securing portion 32, that is to say, substantially between the counter-catch element 33 and the positioning pin 35, and is, for example, ferromagnetic, the magnet 40 may apply magnetic retention forces to the wall 28 and thereby retain the magnet retention member 1 on the locking sleeve 27. In particular a direct mechanical contact between the magnet 40 and the locking sleeve 27 ensures high retention forces. In particular, when the magnetic field lines being discharged from the magnet 40 extend substantially parallel with the radial direction R, the magnet 40 bonds well with the locking sleeve 27.

If the magnet housing 8 is constructed with the magnet opening $M_1$ facing away from the locking sleeve 27, the magnetic field can extend from the magnet housing 8 in an unimpeded manner. During use of the position sensor arrangement, a position sensor, in particular a magnet sensor and, for example, a Hall sensor, may convert the magnetic field present at the sensor and brought about by the magnet 40 into an electrical signal. In a predetermined position of the locking sleeve, for example, when the guiding pin of the gear mechanism is arranged in the selection channel 31, the magnet 40 may have a maximum proximity to the sensor. The magnetic field at the sensor is then at a maximum. If a gear is engaged and the guiding pin is thus not arranged in the selection channel 31, but instead in one of the switching channels 30, the magnet 40 may have a greater spacing relative to the sensor. The magnetic field present is smaller.

In order to be able to establish all the idle positions arranged along the selection channel 31, the magnet retention member 1 preferably extends along the selection channel 31 and has parallel with the selection channel 31 and in particular in the longitudinal direction thereof a greater extent than transversely relative thereto.

In order to be able to ensure an adequate level of measurement precision, the magnetic field is intended to extend from the magnet 40 in the most parallel manner possible relative to the radial direction R or the vertical direction H.

Deviations from the orientation of the magnetic field lines with respect to the vertical direction H or the radial direction R of, for example, up to 3°, may be problem-free. If the angular deviation of the magnets 4 deviates to a greater extent than predetermined, the magnets 40 must be selected prior to their use. The production complexity of the magnet retention member 1 is thereby increased.

If the locking sleeve 27 is now, at least extending in the region of the securing portion 32, that is to say, in a peripheral direction U which extends transversely relative to the radial direction R and the longitudinal direction L, completely magnetisable and in particular ferromagnetic, the locking sleeve 27 may direct and amplify the magnetic field. Since the orientation of the wall 28 of the locking sleeve 27 is generally substantially more precise than the anticipated error of the orientation of the magnetic field of the magnet 40 alone, the amplification of the better orientated locking sleeve 27 ensures an orientation of the magnetic field which is discharged by the position sensor arrangement and which deviates less from the desired orientation than the orientation of the magnetic field brought about by the magnet 40 alone. Consequently, with the position sensor arrangement 37 according to the invention, it is also possible to use magnets 40 which bring about a magnetic field with an orientation which is outside the previously permissible tolerance. A selection of the magnets 40 to the previous extent is therefore no longer necessary. Owing to the amplification of the at least partially ferromagnetic locking sleeve 27, it is further possible to use magnets 40 which bring about a weaker magnetic field. The material costs for the magnet 40 are also reduced thereby.

The invention claimed is:

1. A magnet retention member which is profiled for fitting to a wall of a locking sleeve for a gear mechanism, wherein the magnet retention member has a first and a second retention arm, the retention arms delimiting a retention slot for receiving a securing portion of the wall in a mutually opposing manner, wherein one of the retention arms is constructed with a magnet housing which has a magnet receiving member, the magnet housing extending over the retention slot.

2. The magnet retention member according to claim 1, wherein the magnet receiving member is constructed so as to be open with respect to the retention slot.

3. The magnet retention member according to claim 1, wherein the magnet receiving member is parallel with a longitudinal direction (L) of the retention slot a greater extent than transversely relative to the longitudinal direction (L).

4. The magnet retention member according to claim 1, wherein the magnet retention member is provided with a magnet and the magnet housing has a magnet opening which opens to the retention slot.

5. The magnet retention member according to claim 1, wherein one of the retention arms is constructed as a catch arm having a catch element for engagement with the locking sleeve.

6. The magnet retention member according to claim 1, wherein the magnet retention member is provided with a tilting prevention system which at least limits a tilting of the magnet retention member which is fitted to the locking sleeve relative to the locking sleeve.

7. The magnet retention member according to claim 6, wherein the tilting prevention system has at least one support element which is constructed so as to extend away from the retention slot.

8. The magnet retention member according to claim 1, wherein the first retention arm is provided with the magnet housing and the second retention arm is constructed as the catch arm.

9. A magnet retention member which is profiled for fitting to a wall of a locking sleeve for a gear mechanism, wherein the magnet retention member has a first and a second retention arm, the retention arms delimiting a retention slot for receiving a securing portion of the wall in a mutually opposing manner, the magnet retention member is provided with a tilting prevention system which at least limits a tilting of the magnet retention member which is fitted to the locking sleeve relative to the locking sleeve, wherein the tilting prevention system has at least one positive-locking element which adjoins the retention slot.

10. The magnet retention member according to claim 9, wherein the positive-locking element abuts the catch element.

11. The magnet retention member according to claim 9, wherein the magnet retention member has a base, to which the retention arms are secured, the base being provided with the positive-locking element.

12. A magnet retention member which is profiled for fitting to a wall of a locking sleeve for a gear mechanism, wherein the magnet retention member has a first and a second retention arm, the retention arms delimiting a retention slot for receiving a securing portion of the wall in a mutually opposing manner, wherein there is arranged on one of the retention arms an inclined introduction member which is orientated in the direction towards a free end of the other retention arm.

13. A position sensor arrangement, comprising:
a locking sleeve for a gear mechanism, having a wall, a slotted switching member being provided in the wall, wherein the wall is constructed with a securing portion; and
a magnet retention member profiled for fitting to the wall of the locking sleeve, wherein the magnet retention member has a first and a second retention arm, the retention arms delimiting a retention slot for receiving the securing portion of the wall in a mutually opposing manner.

* * * * *